Dec. 17, 1935.　　　G. M. BARNES ET AL　　　2,024,199
VEHICLE
Filed Jan. 14, 1935　　　2 Sheets-Sheet 1
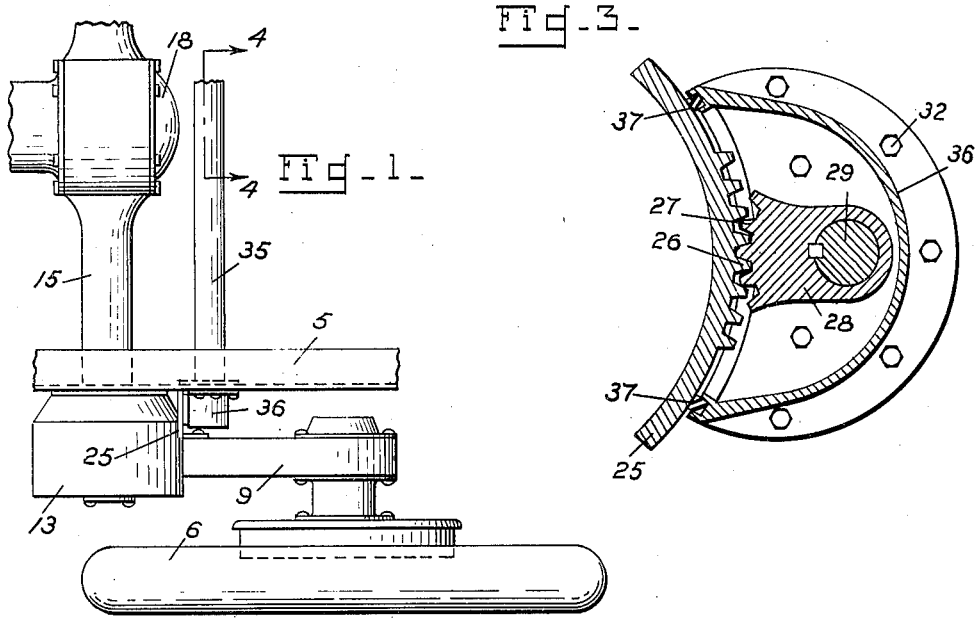
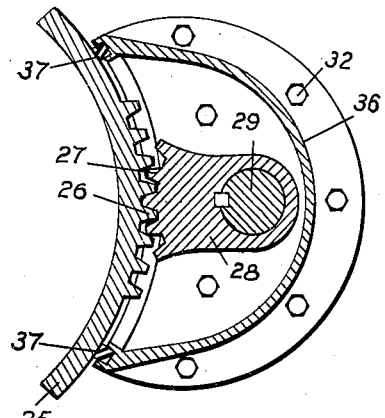
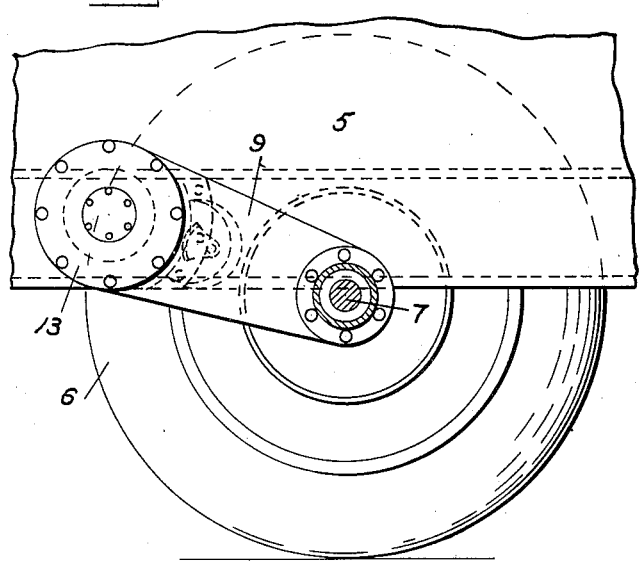
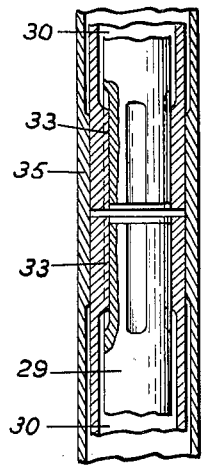
Inventors
Gladeon M. Barnes
Warren E. Preston
By W. N. Roach
Attorney

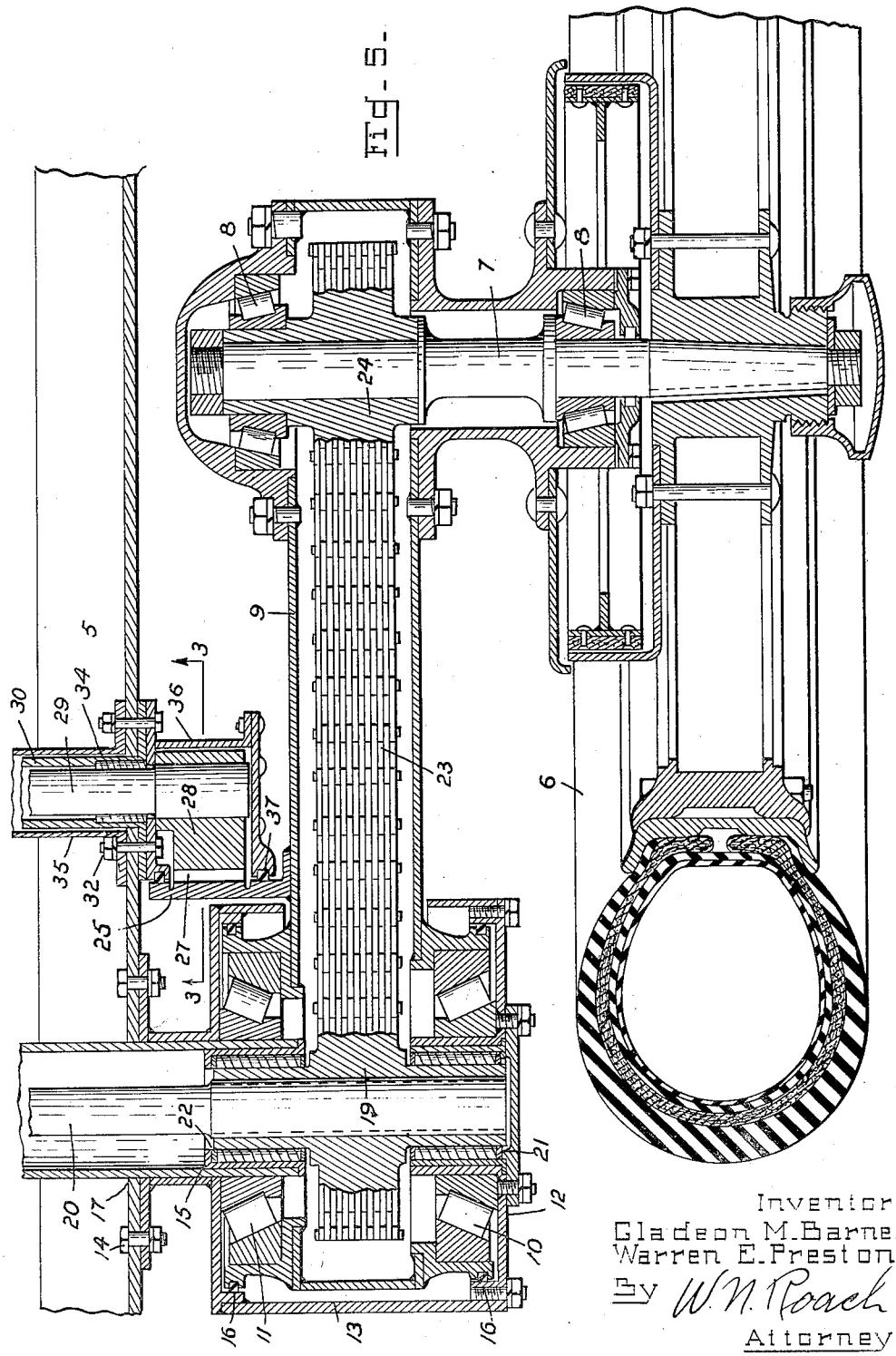

Patented Dec. 17, 1935

2,024,199

UNITED STATES PATENT OFFICE 2,024,199

VEHICLE

Gladeon M. Barnes, Hastings, Mich., and
Warren E. Preston, Aberdeen, Md.

Application January 14, 1935, Serial No. 1,676

2 Claims. (Cl. 180—72)

(Granted under the act of March 3, 1883, as
amended April 30, 1928; 370 O. G. 757)

The invention described herein may be manufactured and used by or for the Government for governmental purposes, without the payment to us of any royalty thereon.

This invention relates to a vehicle and more particularly it has reference to a wheel mounting and suspension.

The purpose of the invention is to provide a mounting for a driving wheel which has an independent vertical movement and is associated in a novel manner with a yielding suspension unit, whereby the range of action of the mounting and suspension unit is controlled.

To these and other ends, the invention consists in the construction, arrangement and combination of elements described hereinafter and pointed out in the claims forming a part of this specification.

A practical embodiment of the invention is illustrated in the accompanying drawings, wherein:

Fig. 1 is a plan view of a portion of a vehicle equipped with the improved suspension.

Fig. 2 is a view in side elevation.

Fig. 3 is a sectional view on the line 3—3 of Fig. 5.

Fig. 4 is a sectional view on the line 4—4 of Fig. 1.

Fig. 5 is a transverse sectional view through the wheel mounting and suspension.

Referring to the drawings by characters of reference, there is shown a load member 5 such as a vehicle body which is to be mounted on a plurality of mobile supporting units such as wheels, one of the wheels being shown at 6. In the illustration the wheel 6 is power driven and is keyed on a spindle 7 which is mounted in bearings 8—8 in the outer or free end of a crank arm 9.

The crank arm 9 is rotatably mounted on antifriction bearing units 10 and 11, the outer unit 10 carried by the cover plate 12 of a bracket 13 which is secured to the load member 5 by bolts 14, and the inner unit 11 carried by the axle housing 15 and confined by the bracket. The hub of the arm is provided with packing rings 16—16 contacting the bracket.

The bracket serves as a support for the axle housing 15 which extends through an aperture 17 in the load member and is fixed to the load member in any convenient manner. The axle housing includes the usual differential casing 18. A sprocket wheel 19 splined on the outer end of each driven axle 20 in the housing 15, is mounted on bearings 21 and 22 respectively carried by the bracket 13 and axle housing 15. A chain 23 housed in the crank arm 9 is trained about the sprocket wheel 19 and a sprocket wheel 24 fast on the spindle 7. The crank arm forms a casing which is filled with a lubricant.

The crank arm 9 carries a link 25 having a gear segment 26 which meshes with a gear segment 27 on a lever 28 associated with a yielding suspension carried by the load member. The particular suspension illustrated in the drawings is the subject of a separate application, Serial No. 708,138 of January 24, 1934.

This suspension comprises a pair of concentric shafts, the inner shaft 29 having its outer end connected to the lever 28 and the outer shaft 30 having a flange 31 on its outer end which engages the outside of the load member and is secured thereto by bolts 32. The inner ends of the concentric shafts are connected by splines 33, (Fig. 4) and the outer ends of the shafts are spaced by roller bearings 34. The shafts are enclosed in a tubular casing 35 whose outer end is secured by the bolts 32. These bolts also serve to attach a casing 36 which encloses the lever 28 and has a packing 37 contacting the link 25. The link 25 constitutes a movable side for the casing 36 and also contacts the packing 37.

The casings enclosing the shafts and lever are filled with a lubricant.

Under normal conditions of operation the crank arm does not move angularly relative to the load member which is thereby supported through the link 25, lever 28 and shafts 29 and 30. The crank arm can only move through torsional action of the shafts within their elastic limit.

By selecting the ratio of the geared link and lever the amount of torsion of the shafts 29 and 30 can be maintained within practical limits and the movement of the crank arm can be regulated. Thus if the radius of gear segment 27 of the lever is increased and the radius of the gear segment 26 of the link accordingly decreased, the angular movement of the torsion members will be reduced.

While only one set of torsion shafts 29 and 30 has been shown it is to be understood that a plurality of such sets may be used in the same manner.

We claim:

1. In a suspension for a vehicle, a load member, a housing fixed to the load member, a driven axle in the housing, a bracket fixed to the load member and associated with the outer end of the housing, a sprocket wheel on the outer end of the axle and mounted in the housing and bracket, a hollow crank arm having one end rotatably mounted in the bracket, a spindle in the free end of the crank arm, a traction wheel on the spindle, a sprocket wheel on the spindle, a chain trained about the sprocket wheels, a link carried by the crank arm and having a gear segment, and a suspension unit carried by the load member and including a lever having a gear segment meshing with the gear segment of the link.

2. In a suspension for a vehicle, a load member, a housing fixed to the load member, a driven axle in the housing, a bracket fixed to the load member and associated with the outer end of the housing, a sprocket wheel on the outer end of the axle and mounted in the housing and bracket, a hollow crank arm having one end rotatably mounted in the bracket, a spindle in the free end of the crank arm, a traction wheel on the spindle, a sprocket wheel on the spindle, a chain trained about the sprocket wheels, and a suspension unit between the crank arm and load member.

GLADEON M. BARNES.
WARREN E. PRESTON.